US010690901B2

(12) United States Patent
Cohen

(10) Patent No.: US 10,690,901 B2
(45) Date of Patent: Jun. 23, 2020

(54) APPARATUS AND METHOD FOR GENERATING IN-FOCUS IMAGES USING PARALLEL IMAGING IN A MICROSCOPY SYSTEM

(71) Applicant: Molecular Devices, LLC, Sunnyvale, CA (US)

(72) Inventor: Avrum Isaac Cohen, Downingtown, PA (US)

(73) Assignee: Molecular Devices, LLC, Sunnyvale, CA (US)

( * ) Notice: Subject to any disclaimer, the term of this patent is extended or adjusted under 35 U.S.C. 154(b) by 207 days.

(21) Appl. No.: 15/522,214

(22) PCT Filed: Oct. 28, 2015

(86) PCT No.: PCT/US2015/057705
§ 371 (c)(1),
(2) Date: Apr. 26, 2017

(87) PCT Pub. No.: WO2016/069685
PCT Pub. Date: May 6, 2016

(65) Prior Publication Data
US 2019/0129160 A1    May 2, 2019

Related U.S. Application Data

(60) Provisional application No. 62/072,230, filed on Oct. 29, 2014.

(51) Int. Cl.
*G02B 21/36* (2006.01)
*G02B 21/00* (2006.01)
(Continued)

(52) U.S. Cl.
CPC ......... *G02B 21/367* (2013.01); *G02B 3/0006* (2013.01); *G02B 21/0008* (2013.01);
(Continued)

(58) Field of Classification Search
CPC .. G02B 21/367; G02B 21/241; G02B 21/362; G02B 3/0006; G02B 7/38; G06K 9/00127; H04N 5/2253; H04N 5/2254
See application file for complete search history.

(56) References Cited

U.S. PATENT DOCUMENTS

| 5,647,025 A | 7/1997 | Frost et al. |
| 2004/0057094 A1* | 3/2004 | Olszak ............ G02B 21/002 |
| | | 359/198.1 |

(Continued)

FOREIGN PATENT DOCUMENTS

| JP | 10256326 A | 9/1998 |
| JP | 2008116526 A | 5/2008 |

(Continued)

OTHER PUBLICATIONS

International Search Report and Written Opinion for PCT/US2015/057705 dated Feb. 3, 2016.

*Primary Examiner* — John R Schnurr
(74) *Attorney, Agent, or Firm* — Ronald A. Rudder; Olive Law Group, PLLC

(57) ABSTRACT

A method of generating in-focus images of measurement locations of a sample holder in a microscopy imaging system is provided. A camera sensor and an array of focusing optics are positioned at a first focal distance from the sample holder. A first image of a measurement location is acquired using the camera sensor. A candidate output image associated with the camera sensor and the array of focusing optics is developed in accordance with the first image. The camera sensor with the array of focusing optics is positioned at a second distance from the sample holder and a second image of the measurement location is acquired using the camera sensor. A portion of the candidate output image is updated in accordance with a portion of the second image in (Continued)

accordance with a selection criterion. The updated candidate image is transmitted.

22 Claims, 5 Drawing Sheets

(51) Int. Cl.
*G02B 3/00* (2006.01)
*G02B 21/24* (2006.01)
*G06K 9/00* (2006.01)
*H04N 5/225* (2006.01)
*G02B 7/38* (2006.01)

(52) U.S. Cl.
CPC ......... *G02B 21/241* (2013.01); *G02B 21/362* (2013.01); *G06K 9/00127* (2013.01); *H04N 5/2253* (2013.01); *H04N 5/2254* (2013.01); *G02B 7/38* (2013.01)

(56) References Cited

U.S. PATENT DOCUMENTS

2011/0091125 A1* 4/2011 Kenny ................. G02B 21/367
    382/254
2014/0293117 A1* 10/2014 Murakami ........... G02B 21/365
    348/349

FOREIGN PATENT DOCUMENTS

JP          2012008254 A    1/2012
JP          2013054133 A    3/2013

* cited by examiner

APPARATUS AND METHOD FOR GENERATING IN-FOCUS IMAGES USING PARALLEL IMAGING IN A MICROSCOPY SYSTEM

RELATED APPLICATION

This application relates to the U.S. Provisional Patent Application Ser. No. 61/817,869, filed Apr. 30, 2013.

TECHNICAL FIELD

This invention relates to automated and semi-automated microscopy for cell biology and other similar research and in particular relates to high content screening microscopy imaging systems.

BACKGROUND

Researchers may use microscopy imaging systems during high-content screenings (HCS) to obtain images of microscopy samples. A sample holder—e.g., a microtiter plate, slide, dish, etc. may support the microscopy samples during the screening process. Automated microscopy imaging systems may include an objective coupled to an electronic imaging device such as a charge-coupled device (CCD) or a complementary metal-oxide-semiconductor (CMOS) chip to produce the images of the microscopy samples. The position of the objective relative to the sample holder may be adjusted to bring the microscopy samples into focus on the imaging device.

The microscopy samples may reside at various measurement locations (e.g., wells) on the upper surface of the sample holder. Accordingly, the objective of the microscopy imaging system may be positioned at a focal position relative to the top or the bottom of the sample holder in order to obtain an in focus image of a microscopy sample. Variations in the thickness or curvature of the sample holder, however, may prevent accurate focus over a range of measurement locations. As a result, the focal position of the objective may need to be corrected at each measurement location in order to obtain respective in focus images for all measurement locations. Because high content screenings may image hundreds or thousands of measurement samples, some microscopy imaging systems may be configured to automatically perform focus maintenance at each measurement location.

To increase the efficiency of imaging, multiple imaging devices may be used to image a plurality of wells in parallel (i.e., simultaneously). However, the time required to focus the objective of each of the multiple imaging devices may eliminate any efficiencies that may be gained from parallel imaging. Further, focusing each objective individually may also increase the complexity of the imaging system.

Therefore, improved systems and methods for generating in-focus images of a plurality of measurement locations using imaging devices operating in parallel in a high content screening microscopy-imaging system are needed.

SUMMARY

A method of generating in-focus images of measurement locations of a sample holder in a microscopy imaging system is provided. An array of focusing optics and a camera sensor is positioned at a first focal distance from the sample holder. A first image of a measurement location is acquired using the camera sensor. A candidate output image associated with the camera sensor is developed in accordance with the first image. The array of focusing optics and the camera sensor are positioned at a second distance from the sample holder and a second image of the measurement location is acquired using the camera sensor. A portion of the candidate output image is updated with a portion of the second image in accordance with a selection criterion. The updated candidate image is transmitted.

A microscopy imaging system for acquiring in-focus images of a plurality of measurement locations of a sample holder is also provided. The system comprises a camera sensor, an array of focusing optics, a motion controller, a motion control module. The motion controller positions the array of focusing optics and the camera sensor relative to the sample holder. A pre-processing module, which is associated with either camera sensors, or motion controller or acquisition system controller, receives images. The motion controller positions the array of focusing optics and the camera sensor at a plurality of distances from the sample holder for acquiring a plurality of images therefrom, wherein each of plurality of images is acquired at a respective one of the plurality of distances. The pre-processing module develops an in-focus image associated with the camera sensor from the plurality of images.

DETAILED DESCRIPTION

Figure 1:
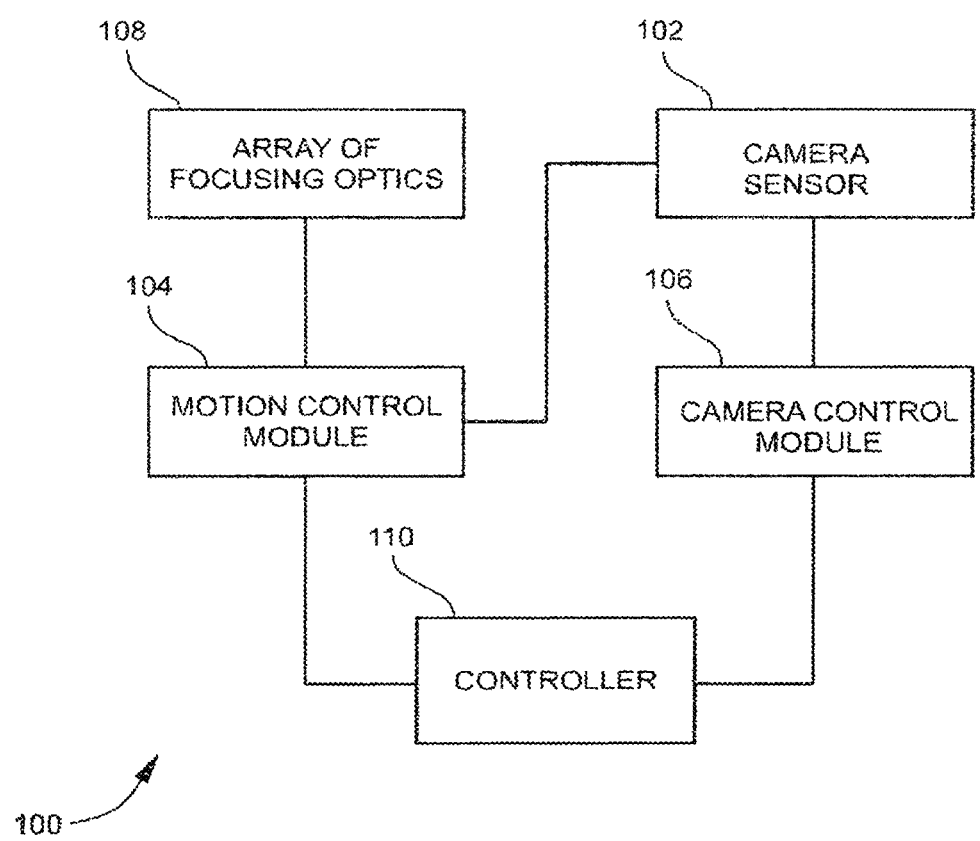
FIG. 1 is a schematic drawing of a parallel image acquisition system.

Referring to FIG. 1, a system 100 for imaging a test plate in parallel comprises a camera sensor 102 with built in pre-processing unit, a motion control module 104, a camera control module 106, an array of focusing optics 108, and controller 110. As described further below, the array of focusing optics 108 may include the focusing optics, which are disposed on a holder in a two dimensional pattern.

During operation, the array of focusing optics 108 and camera sensor 102 are positioned under a sample holder to be imaged. In some embodiments the array of the focusing optics and the camera sensor are initially positioned such that the array of the focusing optics is positioned under a well or a portion of a well of the sample holder. The controller 110 directs the motion control module 104 to move the camera sensor 102 to an initial position such the camera sensor 102 is at least a predetermined initial distance from the bottom of the sample holder. In some embodiments the predetermined initial distance is measured from a top surface of the camera sensor 102 to either a bottom or a top surface of the sample holder. In other embodiments, the predetermined initial distance is measured from the top surface of the objective associated with a particular camera in the camera sensor 102 and either the bottom or the top surface of the sample holder. Other ways of establishing the predetermined initial distance will be apparent to those who have skill in the art.

The controller 110 then directs the camera control module 106 to actuate the camera sensor 102 to obtain a first candidate image therefrom. The image is stored as a candidate output image set in a memory associated with the pre-processing module. In some embodiments the candidate image is provided to the camera control module and is stored in a memory associated with the camera control module. In some embodiments the camera control module provides the candidate image to the acquisition system controller 110.

The acquisition system controller 110 thereafter directs the motion control module 104 to move the array of focusing optics 108 and the camera sensor 102 to a predetermined incremental distance for adjusting the focus upward. In one embodiment, the predetermined incremental distance is determined from the depth-of-field of the array of the focusing optics. For example, the predetermined incremental distance may be substantially identical to such depth-of-field or a fractional multiple of the depth-of-field. The acquisition system controller 110 directs the camera control module 106 to actuate the camera sensor 102 to acquire a further set of images. In some embodiments the further images are also provided to camera control module 106. In some embodiments the camera control module provides the further images to the acquisition system controller 110.

Camera sensor 102 uses a predefined selection criterion to determine if any portion of a candidate image should be updated with a corresponding portion of the further image. Such selection criteria may include whether the portion of the further image has a higher intensity value, a lower intensity value, a higher gradient, better focus, and the like, than the corresponding portion of the candidate image. If the selection criterion is met, the portion of the candidate image is replaced with the corresponding portion of the further image. In one embodiment, the camera sensor having pre-processing module compares each pixel of the further image acquired by the imaging device with a corresponding pixel of the candidate output image associated with such imaging device. If a pixel of the further image has a better focus than a corresponding pixel in the candidate output image, the intensity value associated with the pixel in the candidate output image is replaced with the intensity value of the pixel in the further image. In one embodiment, a first pixel has better focus than a second pixel if the contrast between the first pixel and the immediate neighbors thereof is greater than the contrast between the second pixel and its immediate neighbors. In some embodiments, the contrast between a pixel and the immediate neighbors thereof may be estimated by calculating an average of the differences in intensity between such pixel and each immediate neighbor. In some embodiments, if a pixel of the further image has a higher intensity value than a corresponding pixel of the candidate output image, the intensity value of the pixel of the candidate image is replaced the intensity value of the pixel of the further image. Such embodiments may be useful if the images are of a sample that is fluorescent. In other embodiments, if a pixel of the further image has a lower intensity value than a corresponding pixel of the candidate output image, the intensity value of the pixel of the candidate image is replaced with the intensity value of the pixel of the further image.

In yet another embodiment, the intensity value of a pixel of the further image is added to the intensity value of the corresponding pixel of the candidate image. The image that results from such an embodiment may be useful in quantifying the amount of fluorescent material present in the sample. Other ways of developing the candidate output image apparent to those who have skill in the art may be used.

The acquisition system controller 110 then directs the motion control module 104 to move the array of focusing optics 108 and the camera sensor 102 adjusting the focus to a position identical to the predetermined interval distance. The acquisition system controller 110 thereafter directs the camera control module 106 to actuate the camera sensor 102 to acquire a still further image. The still further image is processed as described above to update the images that comprise the candidate output images. The parallel image acquisition system 100 is operated in this fashion until the focus position of the array of focusing optics 108 and camera sensor 102 has traversed a predetermined range toward the sample holder. In some embodiments, such predetermined range may be based on an expected variation in the curvature or other variation of the bottom surface of the sample holder. In some embodiments, the manufacturer of the sample holder may provide information regarding such expected variation. In other embodiments, measuring one or more sample holders may develop such expected variation. In some embodiments, the predetermined range is between approximately 50 mm and approximately 500 mm. Other ways of establishing the predetermined range will be apparent to those who have skill in the art.

In some embodiments, after the array of focusing optics 108 and camera sensor 102 have traversed the predetermined range towards the sample holder, the controller 110 directs the camera sensor to provide in-focus image. In some embodiments the camera controller retrieves the in-focus image from its own memory. The camera controller provides the in-focus pre-processing module 418 to provide the candidate output image as in-focus output images of the parallel image acquisition system 100. The in-focus output images may be provided to an image storage subsystem and/or an image processing and measurement subsystem associated with the system 100. In some cases, the controller 110 may transmit (for example, over a network or a communication channel) the set of in-focus output images to a separate system for further processing. In some embodiments, the pre-processing module 418 clears the candidate output images from the memory of the pre-processing module 418.

In some embodiments only sections of each image that comprise sample location of interests will be provided from the camera sensor 102 to the camera control module 106. In some embodiments these sections will correspond to individual samples in the sample holder. In some embodiments each section is an independent image that is provided to the camera control and later to the acquisition system controller 110. In some embodiments the entire image or one continuous section of the image is provided form the camera sensor to the camera control module. In some embodiment only sections of each image that comprise sample locations of interests will be provided to the acquisition system controller 110. In yet some embodiments the entire image is provided to the acquisition system controller, while in some embodiments only sections of each image that comprise sample locations of interests will be stored or processed by the acquisition system controller.

In addition, the acquisition system controller 110 directs the motion control module 104 to move the array of focusing optics 108 and camera sensor 102 away from the sample holder until the distance between the array of focusing optics 108 and camera sensor 102 and the sample holder is substantially identical to the predetermined initial distance. The acquisition system controller 110 thereafter directs the motion control module 104 to move the array of focusing optics and camera sensor 102 in a direction substantially parallel to the sample holder so that the imaging devices of the camera array 102 are positioned under a further measurement location that has not yet been imaged. In some embodiments, if the field-of-view of the imaging devices is smaller than a well, the further measurement location may be another portion of the wells just captured. The acquisition system controller 110 directs the motion control module 104 and the camera control module 106. Additional sets of in-focus output images are developed in this manner until all of the measurement locations of the sample holder have been imaged.

In some embodiments, instead of updating each candidate output image on a pixel-by-pixel basis, the pre-processing performed by the camera sensor compares the focus of a captured image to the focus of a corresponding candidate output image. The captured image replaces the corresponding candidate output image if the focus of the captured image is evaluated as being better. The focus of an image may be evaluated, for example, by applying a gradient or an edge detection filter over the image and generating an average of the gradients or detected edges. Other ways of evaluating the focus of an image or comparing the focus of two images will be apparent to those who have skill in the art. Further, it should be apparent that a portion of the candidate image larger than a pixel and smaller than the entire candidate image may be compared with a corresponding portion from the further image to update the candidate image.

In some embodiments of the parallel image acquisition system 100, the array of focusing optics 108 and the camera sensor 102 is held fixed and the motion control module 104 causes movement of the sample holder relative to the array of focusing optics and the camera sensor. In still other embodiments, the motion control module 104 moves both the sample holder and the array of the focusing optics 108 with the camera sensor 102. For example, the motion control module 104 may move camera sensor with the array of focusing optics by increasing or decreasing the distance between them and the sample holder and move the sample holder in directions parallel them to enabling imaging of the various measurement locations on the sample holder. Other ways of the enabling relative movement between the array of the focusing optics 108 with camera sensor 102 and the sample holder will be apparent to those who have skill in the art.

In some embodiments, the motion control module 104 may move or adjust the array of focusing optics instead of moving either the camera sensor or the sample holder.

Figure 2:
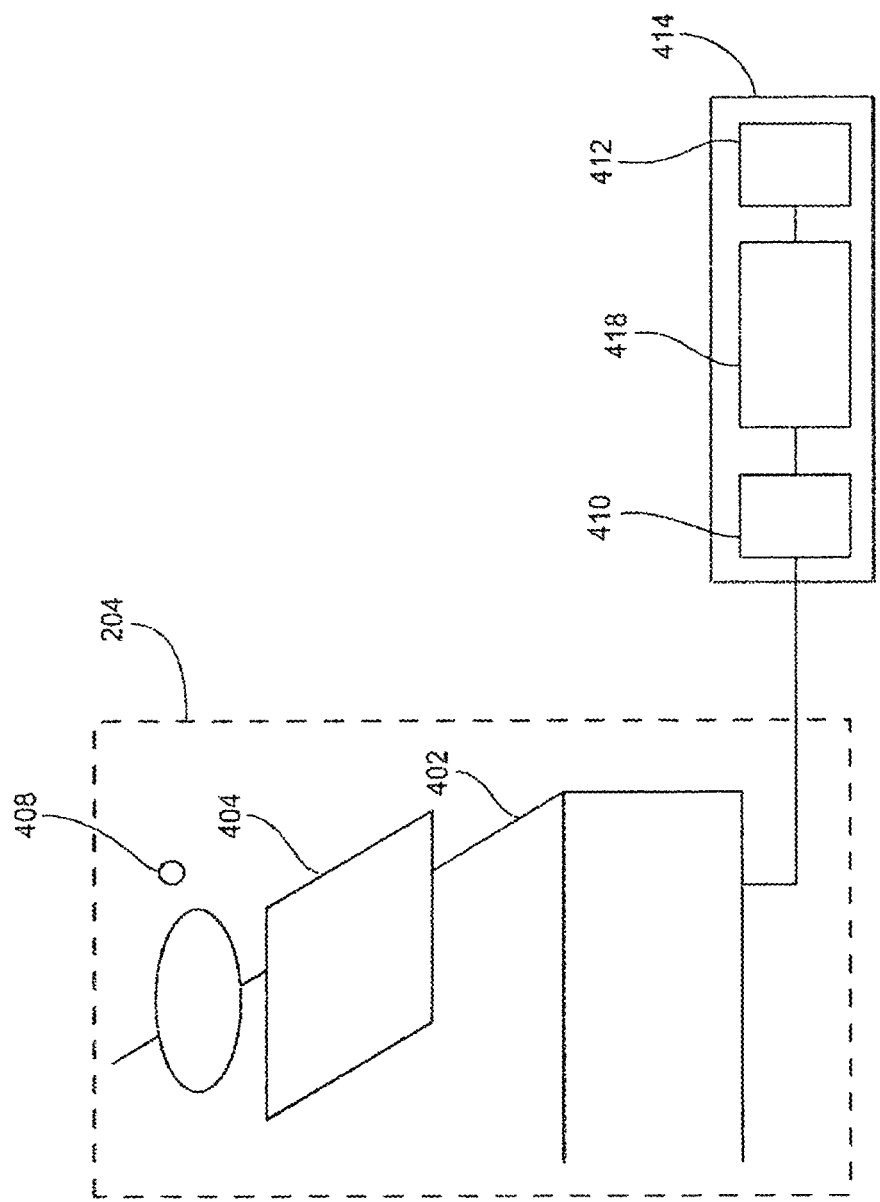
FIG. 2 is an exploded view showing the components of a focus optics that may be used in the parallel image acquisition system of FIG. 1.
Figure 3:
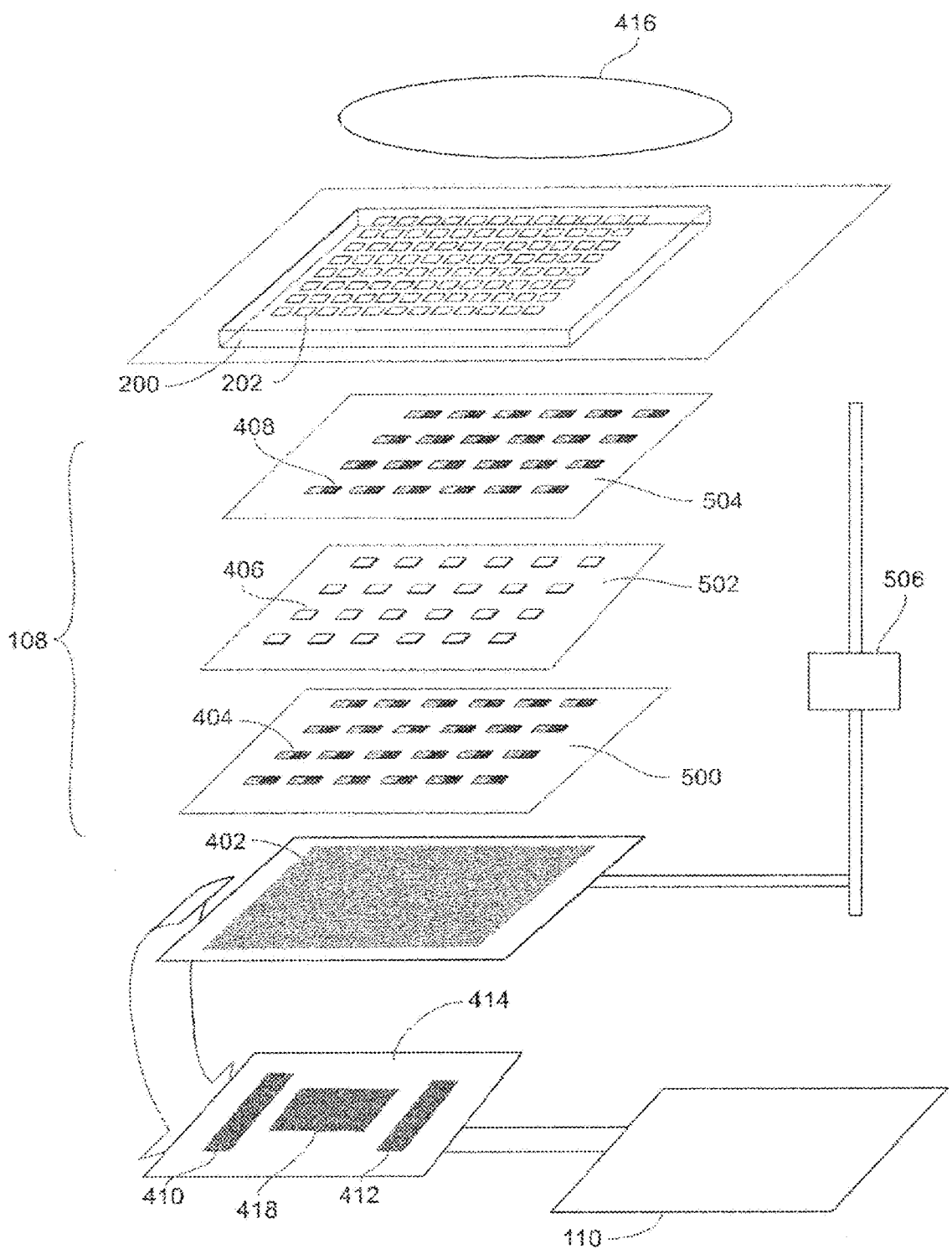
FIG. 3 is an exploded view of a camera array and sample holder of the imaging device of FIG. 1; and FIG. 4A
Figure 4:
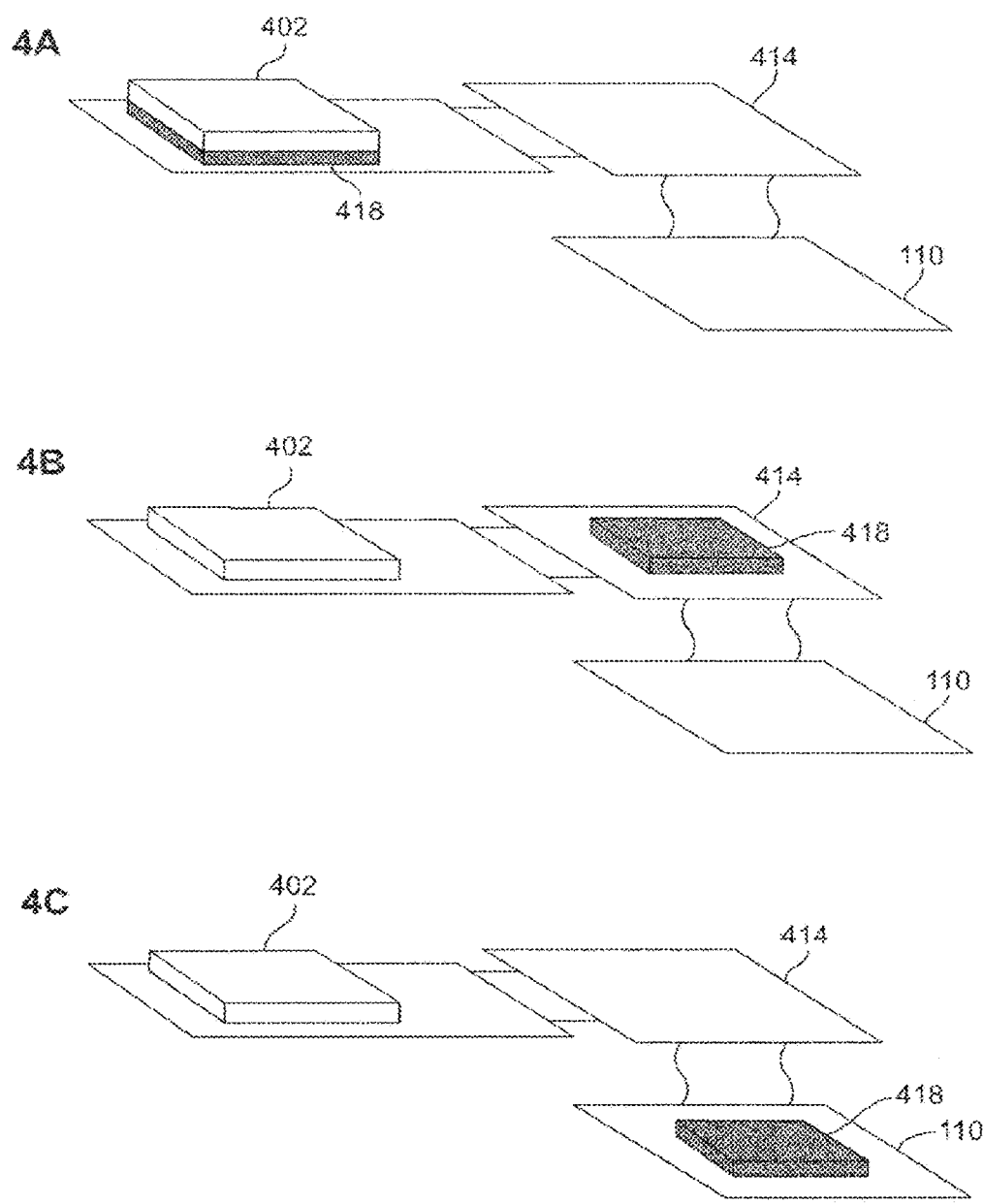
-FIG. 4C is an exploded view of association of a pre-processing module with elements of the parallel imaging acquisition system of FIG. 1 for some embodiments.

Referring to FIGS. 2 and 3, an imaging device 204 comprises image acquisition electronics 402 including, for example, a CCD or a CMOS chip and associated electronics. Disposed in the light path between the sample holder 200 and the image acquisition electronics 402 is one or more filters 404 and/or lenses 406. A light source 408 such as a light emitting diode (LED) may also be disposed between the image acquisition electronics 402 and the sample holder 200. The light source 408 is disposed such that the light source 408 does not interfere with the light path between the sample holder 200 and the image acquisition electronics 402. During operation, light emitted by the light source 408 reflects off of the measurement location 202 that is to be imaged, passes through the lens 406 and the filter 404, and is sensed by the image acquisition electronics 402. In other embodiments, the light emitted by the light source 408 excites fluorescent molecules of the sample at the measurement location 202. The light emitted by such fluorescent molecules in response to such excitation passes through the lens 406 and the filter 404, and is sensed by the image acquisition electronics 402.

In some embodiments, a further light source 416 may be disposed such that the sample holder 200 is between the further light source 416 and the image acquisition electronics 402. The light from the further light source 416 is transmitted through the sample disposed in the sample holder 200 at the measurement location 202 to be imaged, through the lens 406 and the filter 404, and is sensed by the image acquisition electronics 402. In some applications, only the light source 408 may be used to illuminate the sample disposed in the sample holder 200. In other applications, only the light from the further light source 416 may be used to illuminate such measurement location. In still other applications, light from both the light source 408 and the further light source 416 may be used, either simultaneously or separately, to illuminate such measurement location. In some embodiments, if the light from both the light source 408 and further light source 416 are used separately to image particular measurement locations 202, a first set of in-focus output images is developed using the light source 408.

In some embodiments, the camera control module 106 may direct the camera sensor 102 to capture multiple images of the measurement location each time the array of focusing optics and camera sensor 102 are repositioned to develop a plurality of image channels. For example, one channel may be developed when the measurement location is illuminated by the light source 408 and another channel may be developed when the measurement location is illuminated by the light source 416. In some embodiments, the light source 408 (or the light source 416) may be capable of producing different wavelengths of light. In such cases, the sample is illuminated with each such wavelength of light and an image channel associated with such wavelength of light is acquired. For example, the light source 408 may comprise a plurality of LEDs, wherein each LED emits a particular color of light. The camera control module 106 may actuate one or a combination of such LEDs for each image channel that is acquired. In some embodiments, the filter 404 may comprise one or more sub-filters wherein each sub-filter allows one or more wavelengths of light to pass there through. The motion control module 104 may position each sub-filter in the light path between the measurement location and the camera acquisition device associated with such measurement location before an image channel is acquired. In this manner, an image channel may be produced for each such sub-filter. In some embodiments, an output image associated with the measurement location is developed for each channel. In other embodiments, the channels are combined to produce one output image. In some embodiments, two to six image channels are acquired for each measurement location.

In one embodiment, image data generated by the image acquisition electronics 402 pre-processed on the camera sensor. The image data of the imaging device are provided to an additional pre-processing module 418 through an interface 410. The additional pre-processing module 418 transmits output image sets developed by the additional pre-processing module 418 to other systems (not shown) through an interface 412. The interfaces 410 and 412 may be in accordance with a Universal Serial Bus (USB) interface, a FireWire® or IEEE 1394 interface, an Ethernet® interface, or any other interface apparent to one who has skill in the art. In one embodiment, the electronics that implement all or a portion of the interfaces 410 and 412, and the pre-processing module are implemented on a single-board computer 414

Referring once again to FIG. 3, the filters 404 may be disposed on a filter holder 500, the lenses 406 may be disposed on a lens holder 502, and the light sources 408 may be disposed on a light source holder 504. In this manner, the filters 500, the lenses 406, and light sources 408 may be readily interchanged with other filters 406, lenses 406, and/or light sources 408 as desired based on the sample disposed at the measurement location 204 being imaged.

It should be apparent that the order in which the filter holder 500, the lens holder 502, and the light source holder 504 are disposed relative to one another may be varied. In some embodiments, the lens holder 502 may be disposed between sample holder 200 and the filter holder 500. In other embodiments, the filter holder 500 may be disposed between the sample holder 200 and the filter holder 500. In some cases, the lens holder 502 and the light source holder 504 may be disposed such that the light from the light sources 408 passes through the lenses 406 before reaching the sample holder 200. In other cases, the filter holder 500, the lens holder 502, and the light source holder 504 may be disposed such that the light from the light sources 408 passes through one or both of the filters 404 and the lenses 406 before reaching the sample holder 200.

It should be apparent to one who has skill in the art, that the array of focusing optics 108 and the camera sensor 102 may be mounted on an X-Y-Z stage operated by one or more motors 506. Alternately, as described above, the sample holder 200 may be mounted on an X-Y-Z stage operated by the motors 506.

Figure 5:
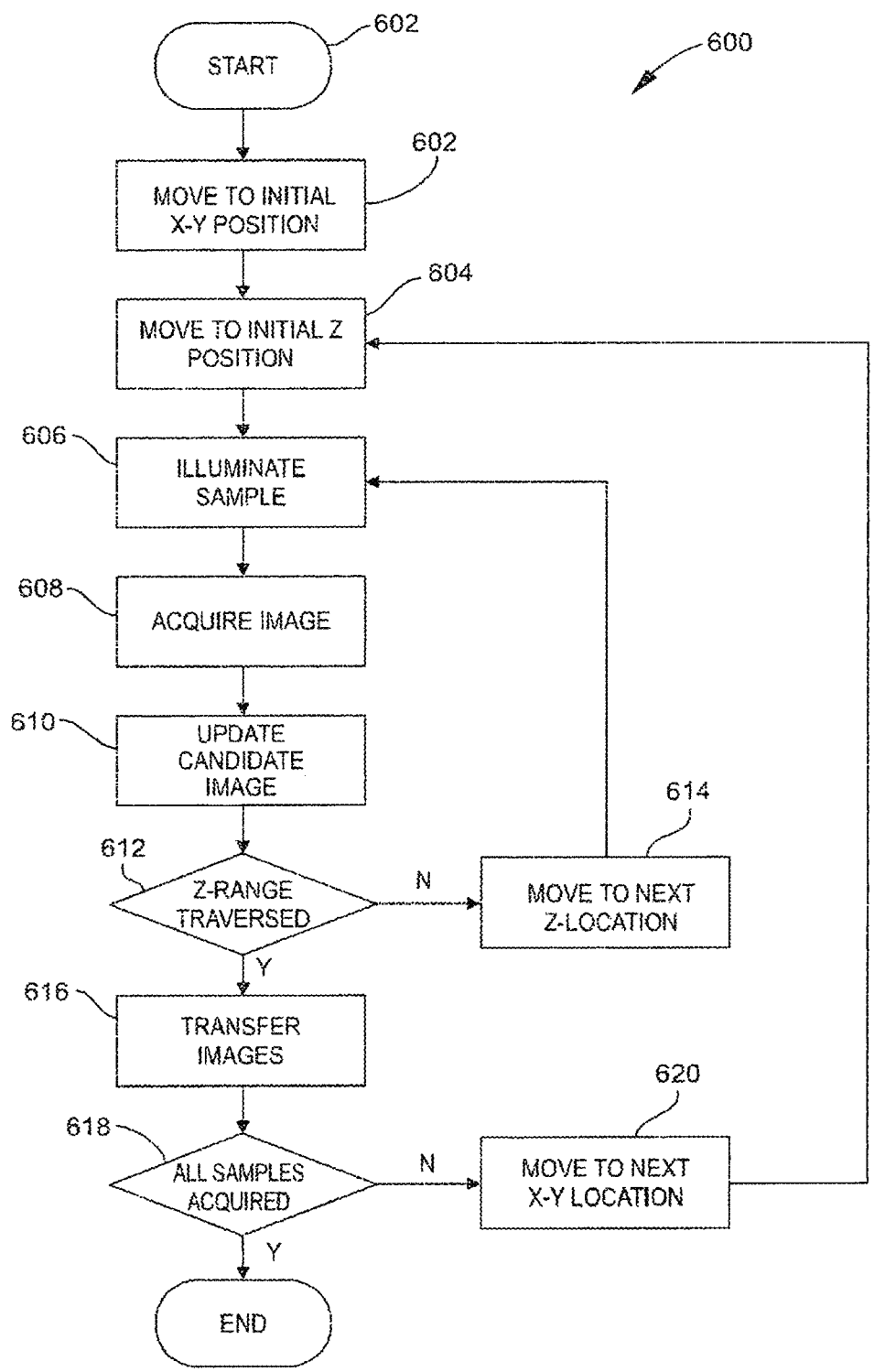
FIG. 5 is a flowchart of processing undertaken by the parallel image acquisition system to develop in-focus images in parallel.

Referring to FIG. 5, a flowchart 600 shows example steps undertaken by the parallel image acquisition system 100 to develop a set of in-focus output images in parallel. At step 602, the motion control module 104 positions the camera sensor 102 relative to the sample holder 200 such that the imaging devices 204 disposed on the array of focusing optics aligned with measurement locations 202 of the sample holder 200. At step 604, the motion control module 104 positions the array of focusing optics 108 and the camera sensor 102 relative to the sample holder 200 such that the distance there between is substantially identical to the predetermined initial distance. At step 606, the camera control module illuminates the measurement locations 202 by actuating one or both of the light sources 408 and 416. As described above, in some embodiments the light source 408 may emit light that excites the samples disposed at the measurement locations 202 and causes fluorescence of such samples. At step 608, the camera control module 106 directs camera sensor 102 to capture an image. If the system 100 is to capture multiple image channels as described above, all of the image channels are captured without altering the position of the camera sensor 102 relative to the sample plate 200, at the step 608.

At step 610, the camera sensor processes the image and updates the candidate output image associated with such device as described above.

The controller 110 then determines if the array of focusing optics and the camera sensor 102 has traversed the predetermined range, at step 612. If the array of focusing optics 108 and the camera sensor 102 have not traversed the predetermined range, the motion control module 104, at step 614, moves the array of focusing optics 108 and the camera sensor 102 a distance identical to the predetermined incremental distance towards the sample holder 200 (i.e., in a direction parallel to the Z-axis). Thereafter, the parallel image acquisition system 100 proceeds to step 606.

If at step 612, the controller 110 determines that the predetermined range has been traversed, the controller 110 directs the camera sensor. In the next step the controller direct the camera control module to transmit the updated candidate images through the interface 412, at step 616.

At step 618, the controller 110 determines if all of the measurement locations 202 of the sample holder 200 have been imaged. If so, the parallel image acquisition system 100 exits. Otherwise, at step 620, the motion control module 104 positions the array of focusing optics 108 and the camera sensor 102 relative to the sample holder 200 so that imaging devices 204 are aligned with measurement locations 202 that have not been imaged (i.e., moves the array of focusing optics 108 and the camera sensor 102 distances $\Delta X$ and $\Delta Y$ parallel to the X-axis and the Y-axis, respectively). The parallel image acquisition system 100 then proceeds to step 604 to image such locations.

It will be understood and appreciated that one or more of the modules, processes, sub-processes, and process steps described in connection with FIGS. 1-5 may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in FIGS. 1-4. The software memory may include an ordered listing of executable instructions for implementing logical functions (that is, "logic" that may be implemented in digital form such as digital circuitry or source code or in analog form such as analog source such as an analog electrical, sound, or video signal). The instructions may be executed within a processing module or controller (e.g., the motion control module 104, the camera control module 106, the pre-processing module 418, the imaging device 204, which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program can be electronically captured via, for instance, optical scanning of the paper or other medium, then compiled, interpreted, or otherwise processed in a suitable manner if necessary, and then stored in a computer memory or machine memory.

It will also be understood that receiving and transmitting of data as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

Referring to FIG. 4A, FIG. 4B and FIG. 4C, an image preprocessing module may develop the in focus image from the plurality of images. In some embodiments (FIG. 4A) the pre-processing module 418 is associated with the camera sensor 402. In one embodiment the preprocessor is associated with sensor as dual purpose CMOS sensor and processor. In some embodiments FIG. 4B the preprocessing module is associated with the camera controller 414. In some embodiments the pre-processing module is associated with the acquisition system controller 110 (FIG. 4C).

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

What is claimed:

1. A method of generating in-focus images of measurement locations of a sample holder in a microscopy imaging system, the method comprising:
   (a) positioning a single camera sensor and an array of focusing optics at a first focal distance from the sample holder, wherein each of the focusing optics of the array of focusing optics is aligned with respective measurement locations of the sample holder, the respective measurement locations comprising a first set of the measurement locations of the sample holder;
   (b) acquiring a first image of the first set of measurement locations using the array of focusing optics and the single camera sensor;
   (c) developing a candidate output image associated with the camera sensor and the array of focusing optics in accordance with the first image, the candidate output image comprising a first set of images at the first focal distance;
   (d) positioning the camera sensor and the array of focusing optics at a second focal distance from the sample holder by varying a focus position of the array of focusing optics and the single camera sensor over a predetermined range based on a variation in a curvature of the sample holder;
   (e) acquiring a second image of the first set of measurement locations, using the camera sensor, the second image comprising a second set of images at the second focal distance;
   (f) updating any portion of the first set of images of the candidate output image by replacing the portion with a selected image, the selected image comprising at least part of one of the second set of images having more than one pixel, the at least one part selected in accordance with a selection criterion in order to produce an updated candidate output image comprised of multiple images; and
   (g) transmitting the updated candidate output image.

2. The method of claim 1, further comprising repeating steps (d) through (f) until the camera sensor has traversed a predetermined range of focus.

3. The method of claim 1, wherein updating the portion of the candidate output image comprises updating more than one pixel of the candidate output image.

4. The method of claim 3, wherein updating the portion of the candidate output image further comprises comparing an intensity value of the pixel of the candidate image with an intensity value of a neighboring pixel thereof to develop a first evaluation of focus, and comparing the intensity value of a corresponding pixel of the second image with a neighboring pixel thereof to develop a second evaluation of focus.

5. The method of claim 4, wherein updating the pixel of the candidate output image further comprises replacing the intensity value of the pixel of the candidate output image with the intensity value of the corresponding pixel of the second image if the second evaluation of focus is greater than the first evaluation of focus.

6. The method of claim 1, further comprising:
   (h) causing relative movement between the camera sensor with the array of focusing optics and the sample holder such that the camera sensor with array of the focusing optics are aligned with respective measurement locations of a second set of second measurement locations; and
   (i) developing a second updated candidate output image, wherein the second updated candidate output image is associated with the second set of measurement locations.

7. The method of claim 1, wherein the imaging device includes image acquisition electronics, and further comprising:
   (h) positioning a first filter in a light path between the measurement location and the camera sensor, wherein the first filter is positioned in the light path when the first image is acquired;
   (i) positioning a second filter in the light path; and (g) acquiring a second image of the measurement location using the camera sensor wherein the second filter is positioned in the light path when the second image is acquired.

8. The method of claim 7, wherein the position of the camera sensor with the array of the focusing optics relative to the sample holder when the first image is acquired is substantially identical to the position of the camera sensor and the array of the focusing optics relative to the sample holder when the second image is acquired.

9. The method of claim 1, further comprising acquiring a second image of the measurement location using the camera sensor and the array of focusing optics, wherein the first image is acquired using a first illumination condition and the second image is acquired using a second illumination condition.

10. The method of claim 1, further comprising a first additional step between steps (b) and (c), wherein the first image is splitting into a plurality of first images; and a second additional step between steps (e) and (f), wherein the second image is splitting into a plurality of second images.

11. A microscopy imaging system for acquiring in-focus images of a plurality of measurement locations of a sample holder, comprising:
- a single camera sensor;
- an array of focusing optics, wherein each of the focusing optics of the array of focusing optics is aligned with respective measurement locations of the sample holder, the respective measurement locations comprising a first set of the measurement locations of the sample holder;
- a motion controller for positioning the camera sensor with the array of focusing optics relative to the sample holder; and
- a pre-processing module for receiving images acquired by the camera sensor,
- wherein the motion controller positions the camera sensor with the array of focusing optics at a plurality of focal distances from the sample holder, the camera sensor acquires a plurality of images, wherein each of plurality of images is acquired at a respective one of the plurality of focal distances, and the pre-processing module develops an in-focus image associated with the imaging device from the plurality of images by a program which is configured to
- acquire a first image of the first set of measurement locations using the array of focusing optics and the single camera sensor,
- develop a candidate output image associated with the camera sensor and the array of focusing optics in accordance with the first image, the candidate output image comprising a first set of images at the first focal distance,
- position the camera sensor and the array of focusing optics at a second focal distance from the sample holder by varying a focus position of the array of focusing optics and the single camera sensor over a predetermined range based on a variation in a curvature of the sample holder,
- acquire a second image of the first set of measurement locations, using the camera sensor, the second image comprising a second set of images at the second focal distance, and
- update any portion of the first set of images of the candidate output image by replacing the portion with a selected image, the selected image comprising at least part of one of the second set of images having more than one pixel, the at least one part selected in accordance with a selection criterion in order to produce an updated candidate output image comprised of multiple images.

12. The microscopy imaging system of claim 11, wherein the pre-processing module is associated with camera controller, and the pre-processing module develops an in-focus image associated with the camera sensor from the plurality of images.

13. The microscopy imaging system of claim 11, wherein the pre-processing module is associated with the array of focusing optics and the pre-processing module develops an in-focus image associated with the array of focusing optics from the plurality of images.

14. The microscopy imaging system of claim 11, wherein the pre-processing module is associated with the acquisition system and the pre-processing module develops an in-focus image associated with the acquisition system from the plurality of images.

15. The microscopy imaging system of claim 11, wherein the plurality of focal distances is within a predetermined range and the predetermined range is associated with the curvature of sample holder.

16. The microscopy imaging system of claim 11, wherein the motion controller causes a relative movement between the camera sensor with the array of focusing optics and the sample holder such that the camera sensor and the array of focusing optics are aligned with a second set of measurement locations, the imaging device acquires a second plurality of images of the second set of measurement locations, and the pre-processing module develops a second in-focus image from the second plurality of images.

17. The microscopy imaging system of claim 16, wherein the pre-processing module develops a second in focus image associated with the camera sensor.

18. The microscopy imaging system of claim 16, wherein the pre-processing module develops a second in-focus image associated with camera controller.

19. The microscopy imaging system of claim 16, wherein the pre-processing module develops a second in-focus image associated with the acquisition system.

20. The microscopy imaging system of claim 11, comprises a first filter disposed in a light path between the sample holder and the camera sensor when the first plurality of images is acquired and a second filter disposed in the light path between the sample holder and the camera sensor when the second plurality of images is acquired.

21. The microscopy imaging system of claim 20, wherein the position of the camera sensor and the array of focusing optics relative to the sample holder when the plurality of images is acquired is substantially identical to the position of the camera sensor and the array of focusing optics relative to the sample holder when the second plurality of images is acquired.

22. The microscopy imaging system of claim 11, further comprising a first illumination source and a second illumination source, wherein the first illumination source is actuated when the plurality of images is captured and the second illumination source is actuated when a when a second plurality of images is acquired.

* * * * *